United States Patent [19]

Driessen et al.

[11] Patent Number: 5,214,126
[45] Date of Patent: May 25, 1993

[54] POLYMERIZATION OF CO/OLEFIN WITH NICKEL COMPOUND MERCAPTO CARBOXYLIC ACID REACTION PRODUCT CATALYST

[75] Inventors: Birgit Driessen, Aachen, Fed. Rep. of Germany; Michael J. Green, Surrey, England; Wilhelm Keim, Aachen, Fed. Rep. of Germany

[73] Assignee: The British Petroleum Company, p.l.c., London, England

[21] Appl. No.: 738,818

[22] Filed: Aug. 1, 1991

[30] Foreign Application Priority Data

Aug. 9, 1990 [GB] United Kingdom ............... 9017501

[51] Int. Cl.$^5$ ............................................. C08G 67/02
[52] U.S. Cl. ................................................... 528/392
[58] Field of Search ......................................... 528/392

[56] References Cited

U.S. PATENT DOCUMENTS 3,984,388 10/1976 Shryne et al. .................... 528/392
4,965,341 10/1990 Van Doorn et al. ............... 528/392

OTHER PUBLICATIONS

Chemical Abstracts, vol. 108, No. 12, Mar. 21, 1988, Columbus, Ohio., US; Abstract No. 94971R.

*Primary Examiner*—Harold D. Anderson
*Attorney, Agent, or Firm*—Brooks Haidt Haffner & Delahunty

[57] ABSTRACT

A process for preparing polyketones (alternating polymers of carbon monoxide and one or more olefins) is provided. The process is characterized by using the nickel catalyst obtained by reacting a nickel compound, e.g. nickel acetate, nickel carbonyl or bis(cyclooctadiene) nickel(O), with a thiol-substituted carboxylic acid of formula HS—R—CO$_2$H (R is a divalent organic radical). Preferred thiol-substituted carboxylic acids include 2-mercaptobenzoic acid, 4-mercaptobenzoic acid, 2 mercaptonicotinic acid and compounds of formula HS—CHR$^2$—CO$_2$H where R$^2$ is selected from hydrogen, —CH$_3$ and —CH$_2$CO$_2$H.

10 Claims, No Drawings

POLYMERIZATION OF CO/OLEFIN WITH NICKEL COMPOUND MERCAPTO CARBOXYLIC ACID REACTION PRODUCT CATALYST

The present invention relates to a process for preparing linear alternating polymers of one or more olefins and carbon monoxide (hereafter called polyketones) by polymerising one or more olefins with carbon monoxide in the presence of a nickel catalyst. In particular the present invention relates to new nickel catalysts for use in such processes. Polyketones are potentially useful as plastics from which a range of articles can be fabricated.

The preparation of polyketones comprised of alternating units having the general formula —X— and —CO—, where X is a divalent organic group derived from the corresponding olefin(s), is a known process. For example U.S. Pat. No. 3,694,412 teaches that polyketones can be made by polymerising one or more olefins with carbon monoxide in the liquid phase in the presence of an aryl phosphine complex of a palladium halide.

More recently, EP 121965 discloses a process for preparing polyketones by reacting an olefin with carbon monoxide in the presence of a catalyst derived from (a) a Group VIII metal selected from palladium, cobalt and nickel, (b) a bidentate ligand of formula $R_1R_2MRMR_3R_4$ where R is an alkylene group, $R_1$-$R_4$ are hydrocarbon groups and M is phosphorus, arsenic or antimony and (c) the anion of a carboxylic acid with a pKa of less than 2. Such catalysts are alleged to be more active than those previously described.

U.S. Pat. Nos. 4,965,341 and 4,948,870 discloses similar catalysts in which the bidentate ligand is a disulphide.

U.S. Pat. No. 3,661,803 describes the homopolymerisation of ethylene in the presence of complex nickel catalysts containing a glycolic acid, thioglycolic or thiolactic acid ligand whilst U.S. Pat. No. 3,637,636 discloses the use of nickel catalysts combined with thiol-, cyano- and amine-substituted benzoic acids for the same application.

It has now been found that nickel catalysts prepared by reacting a nickel compound with a thiol-substituted carboxylic acids are effective for the production of polyketones.

According to the present invention there is provided a process for preparing polyketones by polymerising a mixture of carbon monoxide and one or more olefins in the presence of an effective amount of a nickel catalyst characterised in that the nickel catalyst is the product obtained by reacting a nickel compound with a bidentate ligand of formula HS—R—$CO_2H$ where R is a divalent organic group.

Whilst the term polyketone is defined as being any copolymer of carbon monoxide and one or more olefin(s), it preferably means a linear alternating polymer in which the —CO— and —Z— units regularly alternate. The —Z— units are divalent organic groups derived from the corresponding olefin(s). The polyketone itself may contain more than one type of —Z— unit, as for example in the case where a mixture of carbon monoxide and at least two olefins are employed, and such differing —Z— units may be arranged randomly or in blocks alternating with the —CO— units. The polyketones produced by the process defined above typically have Limiting Viscosity Numbers (IUPAC term) in the range 0.4 to 4.0 dl.$g^{-1}$ and have melting points up to ca 250° C.

Whilst any olefin or mixture of olefins can be used in the process defined above it is preferred to use one or more of the olefins ethylene, propylene and $C_4$ to $C_{20}$ alpha olefins. By the term alpha-olefin is meant any olefin possessing terminal unsaturation and including for example but-l-ene, hex-l-ene, styrene, acrylic acid, vinyl acetate and the like. The best reaction rates are however, in general, obtained when either ethylene alone or a mixture of ethylene and either propylene or one other alpha olefin is used. In the case of the latter, preferred mixtures include ethylene and propylene, ethylene and but-l-ene and ethylene and pent-l-ene.

It is preferred that the carbon monoxide used is either essentially pure or diluted with no more than 25% by volume of an inert gas such as nitrogen, helium, neon, xenon or carbon dioxide.

The nickel catalyst used to effect polymerisation of the carbon monoxide and the olefin(s) is prepared by reacting a nickel compound with a particular family of bidentate ligands. Whilst the exact choice of the nickel compound is not critical, it should preferably be one in which no strongly coordinating ligands e.g. chloride, bromide, cyanide etc are present. Preferred nickel compounds include nickel acetate, nickel carbonyl, bis(cyclooctadiene)nickel(o) and the like. In the case of nickel carbonyl, this can be generated in situ under the reaction conditions from nickel metal.

The bidentate ligand which forms an essential part of the nickel catalyst is one having the formula HS—R—$CO_2H$ where R is a divalent organic group. Suitable examples of such groups are (a) those having the formula $HS(CR^1_2)_nCO_2H$ where the $R^1$ groups are independently selected from hydrogen, $C_1$ to $C_{10}$ alkyl, —$CH_2CO_2H$, —Cl, —Br, and —CN and n is an integer from 1 to 6 and (b) those having the formula HS—Ph—$CO_2H$ wherein Ph is a divalent radical derived from benzene, pyridine or $C_1$ to $C_6$ alkyl substituted derivatives thereof. Preferred examples of class (a) ligands are those compounds of formula HS—CH$R^2$—$CO_2H$ wherein $R^2$ is selected from hydrogen —$CH_3$ and —$CH_2CO_2H$. Preferred examples of class (b) ligands are 2-mercaptobenzoic acid, 4-mercaptobenzoic acid and 2-mercaptonicotinic acid.

The nickel catalyst itself is most conveniently generated by heating the nickel compound and bidentate ligand together in a solvent. A particularly preferred class of solvents for this purpose are $C_6$-$C_{12}$ aromatic hydrocarbon solvents e.g. benzene, toluene, xylene, mesitylene, ethylbenzene and the like. It is especially convenient however to generate the nickel catalyst in situ under the reaction conditions. If this approach is adopted then it is preferred that the polymerisation reaction is itself carried out in the aromatic hydrocarbon solvent.

In preparing the nickel catalyst it is preferred to use amounts of nickel compound and bidentate ligand such that the molar ratio of nickel to bidentate ligand is in the ratio 2:1 to 1:10 most preferably 3:2 to 1:5. The molar ratio of nickel catalyst to olefin should be in the range 1:10 to 1:$10^5$ and the concentration of nickel in the reaction medium should suitably be in the range 1 to 100 mmol.$l^{-1}$ preferably 5 to 40 mmol.$l^{-1}$.

The process defined above is conveniently carried out at a temperature between 20° and 150° C. preferably 50° to 100° C. and at a total pressure of carbon monoxide, and where appropriate olefin(s) in the range 5 to 50 bar. It is preferred however that the partial pressure of carbon monoxide in such a process should be less than 40% bar in order to avoid catalyst deactivation.

The process of the present invention, which can be operated either batchwise or continuously, is now illustrated with reference to the following Examples.

EXAMPLES 1-8

General Procedure 0.33 mmol of bis(cyclooctadiene)nickel(o), 0.33 mmol of 2-mercaptobenzoic acid and 20 mls of toluene were placed in a 250 ml stainless steel autoclave. The autoclave was sealed, pressurised with the appropriate amounts of ethylene and carbon monoxide and heated to 80° C. After 15 hours at 80° C. the autoclave was cooled and emptied. The polyketone was recovered from the reaction product and thereafter dried and weighed. The results obtained are given in the Tables below. All conversions quoted are based upon the amount of ethylene and carbon monoxide fed.

TABLE 1

| | Influence of CO-pressure | | | |
|---|---|---|---|---|
| Example | p (ethylene) Bar | p (CO) Bar | p Total Bar | Conversion % |
| 1 | 10 | 3 | 13 | 26 |
| 2 | 10 | 4 | 14 | 27 |
| 3 | 10 | 5 | 15 | 35 |
| 4 | 10 | 6 | 16 | 10.7 |
| 5 | 10 | 7 | 17 | 9.5 |
| 6 | 10 | 8 | 18 | 1 |

TABLE 2

| | Influence of Ethene Pressure | | |
|---|---|---|---|
| Example | p (ethylene) Bar | p (CO) Bar | Conversion % |
| 7 | 35 | 5 | 20 |
| 8 | 25 | 5 | 21 |
| 3 | 10 | 5 | 35 |

EXAMPLES 9-15

The general procedure described above was followed except that 10 bar of ethylene and 5 bar of carbon monoxide were used in each experiment and the temperature was varied. The results are given in Table 3.

TABLE 3

| | Influence of Reaction Temperature | | | |
|---|---|---|---|---|
| Example | T °C. | p (ethylene) Bar | p (CO) Bar | Conversion % |
| 10 | 40 | 10 | 5 | 0 |
| 11 | 50 | 10 | 5 | 4.4 |
| 12 | 60 | 10 | 5 | 48 |
| 13 | 70 | 10 | 5 | 35 |
| 3 | 80 | 10 | 5 | 35 |
| 14 | 90 | 10 | 5 | 20.6 |

TABLE 3-continued

| | Influence of Reaction Temperature | | | |
|---|---|---|---|---|
| Example | T °C. | p (ethylene) Bar | p (CO) Bar | Conversion % |
| 15 | 100 | 10 | 5 | 12 |

EXAMPLES 16-21

The general procedure described above was repeated except that 0.33 mmol of 2-mercaptopropionic acid replaced 2-mercaptobenzoic acid. The results given in Table 4 show the influence of temperature and pressure on this catalyst system.

TABLE 4

| | Influence of Pressure and Temperature | | | |
|---|---|---|---|---|
| Example | T °C. | p (ethylene) Bar | p (CO) Bar | Conversion % |
| 16 | 80 | 20 | 5 | 1 |
| 17 | 80 | 20 | 3 | 13.6 |
| 18 | 80 | 10 | 3 | 25.4 |
| 19 | 80 | 8 | 3 | 31.8 |
| 20 | 100 | 10 | 3 | 12.8 |
| 21 | 60 | 10 | 3 | 37.7 |

We claim:

1. A process for preparing polyketones by polymerising a mixture of carbon monoxide and one or more olefins in the presence of a solvent and an effective amount of a nickel catalyst obtained by reacting a nickel compound with a bidentate ligand of formula HS—R—CO$_2$H where R is a divalent organic group.

2. A process as claimed in claim 1 wherein the bidentate ligand has the formula HS(CR$^1$$_2$)$_n$CO$_2$H where the R$^1$ groups are independently selected from hydrogen, C$_1$ to C$_{10}$ alkyl, —CH$_2$CO$_2$H, —Cl, —Br or —CN and n is an integer from 1 to 6.

3. A process as claimed in claim 2 wherein the bidentate ligand has the formula HS(CHR$^2$)CO$_2$H where R$^2$ is selected from hydrogen, —CH$_3$ or CH$_2$CO$_2$H.

4. A process as claimed in claim 1 wherein the bidentate ligand has the formula HS—Ph—CO$_2$H where Ph is a divalent radical derived from benzene, pyridine or C$_1$ to C$_6$ alkyl substituted derivatives thereof.

5. A process as claimed in claim 4 wherein the bidentate ligand is selected from the group consisting of 2-mercaptobenzoic acid, 4 mercaptobenzoic acid and 4-mercaptonicotinic acid.

6. A process as claimed in claim 1 wherein the nickel catalyst is obtained by reacting one mole of the nickel compound with from 0.66 to 5 moles of the bidentate ligand of formula HS—R—CO$_2$H.

7. A process as claimed in claim 1 wherein either ethylene and carbon monoxide or a mixture of ethylene, propylene and carbon monoxide are polymerised.

8. A process as claimed in claim 1 wherein the solvent is a C$_6$ to C$_{12}$ aromatic hydrocarbon solvent.

9. A process as claimed in claim 1 comprising polymerising at a temperature in the range 50° to 100° C.

10. A process as claimed in claim 1 comprising polymerising at a pressure in the range of 5 to 50 bars and a carbon monoxide partial pressure of less than 40% of the total gas pressure.

* * * * *